(12) United States Patent (10) Patent No.: US 12,684,220 B2

Ryu et al. (45) Date of Patent: Jul. 14, 2026

(54) 3D SCANNING AND APPEARANCE INSPECTION APPARATUS FOR CYLINDRICAL SECONDARY BATTERY

(71) Applicant: ENSCAPE CO., LTD., Yongin-si (KR)

(72) Inventors: Ji Man Ryu, Suwon-si (KR); Seong Gi Kim, Cheonan-si (KR); In Ho Ka, Seongnam-si (KR); Nam Dong Kim, Suwon-si (KR); Sang Jin Choi, Seongnam-si (KR); Sang Baek Kim, Seongnam-si (KR)

(73) Assignee: ENSCAPE CO., LTD., Yongin-si (KR)

( * ) Notice: Subject to any disclaimer, the term of this patent is extended or adjusted under 35 U.S.C. 154(b) by 97 days.

(21) Appl. No.: 18/925,569

(22) Filed: Oct. 24, 2024

(65) Prior Publication Data

US 2025/0240511 A1 Jul. 24, 2025

(30) Foreign Application Priority Data

| | | | |
|---|---|---|---|
| Jan. 23, 2024 | (KR) | ......................... | 10-2024-0009913 |
| Apr. 25, 2024 | (KR) | ......................... | 10-2024-0055471 |
| Apr. 25, 2024 | (KR) | ......................... | 10-2024-0055472 |

(51) Int. Cl.
H04N 23/56 (2023.01)

(52) U.S. Cl.
CPC .................................... H04N 23/56 (2023.01)

(58) Field of Classification Search
CPC ...... H04N 23/56; G01B 11/30; G01B 11/303; G01N 21/952
See application file for complete search history.

(56) References Cited

U.S. PATENT DOCUMENTS

| | | | |
|---|---|---|---|
| 7,266,420 B2* | 9/2007 | Budd | ................. G01B 11/2433 |
| | | | 700/95 |
| 2010/0111367 A1* | 5/2010 | Hiraoka | ............. G01B 11/2522 |
| | | | 382/106 |
| 2025/0189465 A1* | 6/2025 | Kim | ......................... G06T 7/13 |

FOREIGN PATENT DOCUMENTS

| | | | | | |
|---|---|---|---|---|---|
| JP | H1-239406 A | | 9/1989 | | |
| JP | 2002-98521 A | | 4/2002 | | |
| JP | 2008076223 A | * | 4/2008 | | |
| JP | 2010-112811 A | | 5/2010 | | |
| JP | 2017-504811 A | | 2/2017 | | |
| JP | 2017-72382 A | | 4/2017 | | |
| JP | 2018-10021 A | | 1/2018 | | |
| JP | 2020-51959 A | | 4/2020 | | |
| JP | 2021-89193 A | | 6/2021 | | |
| KR | 101030449 B1 | * | 4/2011 | ............ | H01M 10/48 |

\* cited by examiner

*Primary Examiner* — Jayanti K Patel
*Assistant Examiner* — Christopher Kingsbury Glover

(57) ABSTRACT

The present disclosure relates to a 3D scanning and appearance inspection apparatus for a cylindrical secondary battery, capable of extracting points for 3D model creation and acquiring a surface image for appearance inspection simultaneously while rotating the cylindrical secondary battery. According to the present disclosure, a construction for 3D scanning and appearance inspection for a cylindrical secondary battery can be simplified, accurate 3D data can be acquired, and accurate appearance inspection is possible.

20 Claims, 24 Drawing Sheets

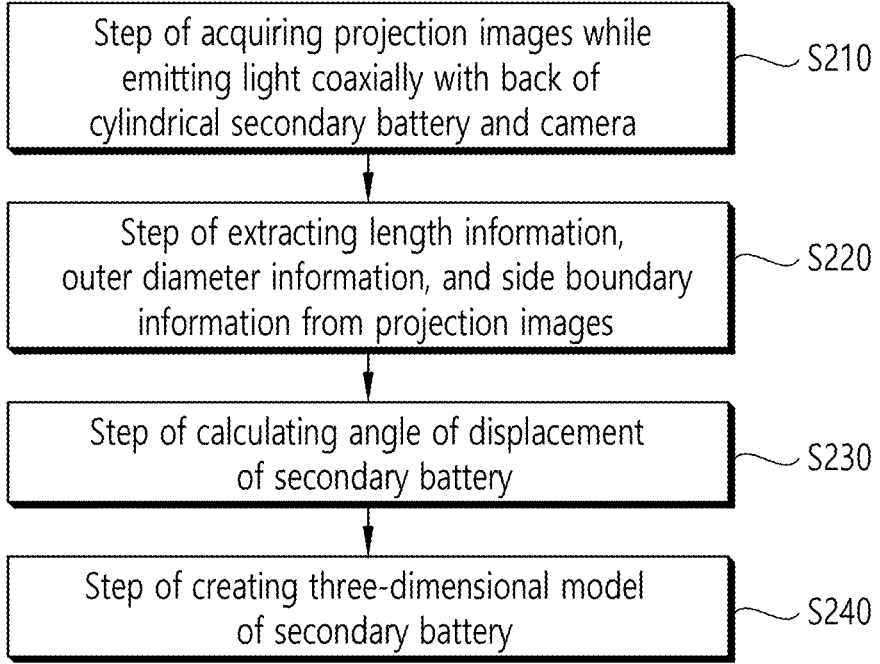

Step of acquiring projection images while emitting light coaxially with back of cylindrical secondary battery and camera ~ S210

Step of extracting length information, outer diameter information, and side boundary information from projection images ~ S220

Step of calculating angle of displacement of secondary battery ~ S230

Step of creating three-dimensional model of secondary battery ~ S240

3D SCANNING AND APPEARANCE INSPECTION APPARATUS FOR CYLINDRICAL SECONDARY BATTERY

CROSS REFERENCE TO RELATED APPLICATION

This application claims priority from Republic of Korea Patent Application No. 10-2024-0009913, filed on Jan. 23, 2024, No. 10-2024-0055471, filed on Apr. 25, 2024 and No. 10-2024-0055472, filed on Apr. 25, 2024, which is hereby incorporated by reference in its entirety.

BACKGROUND

Field

The present disclosure relates to a 3D scanning and appearance inspection apparatus for a cylindrical secondary battery and, more particularly, to an apparatus capable of 3D data generation and appearance inspection by using 2D images.

Description of Related Art

Technologies for scanning 3D data of an object are employed in a variety of industrial applications. In some cases, secondary batteries may require 3D scan data in order to detect physical deformations which occur in the manufacturing process.

For conventional 3D scan data, such techniques as time-of-flight cameras, stereoscopic vision, laser scanning, and photogrammetry have been used. Problems with these techniques are that they take a lot of time to do a 3D scan of a curved surface and have low accuracy.

SUMMARY

An aspect of the present disclosure is to provide an apparatus capable of doing a fast and accurate 3D scan of a cylindrical secondary battery and at the same time inspecting the appearance.

An exemplary embodiment of the present disclosure provides a 3D scanning apparatus for a cylindrical secondary battery, the 3D scanning apparatus including: a rest portion configured for a secondary battery seated thereon to rotate around a longitudinal axis; a rear lighting part configured to emit light toward the side of the secondary battery; a camera provided opposite the rear lighting part, with the secondary battery interposed therebetween; a controller configured to control the rest portion and the camera so as to acquire an image of the secondary battery for each rotation of the secondary battery by a predetermined angle; and a computing part configured to extract points on the outline of the secondary battery from images of the secondary battery and reconstruct a three-dimensional model.

The rear lighting part may be a backlight for the secondary battery, and the camera may be configured to acquire a projection image of the secondary battery.

The computing part may receive information on the predetermined angle by which the secondary battery is rotated, and may reconstruct the three-dimensional model based on the diameter of the secondary battery and the points on the outline for each angle of the secondary battery.

The 3D scanning apparatus may further include a driving part configured for the secondary battery seated thereon to rotate in a longitudinal direction, wherein the controller controls the driving part so as to repeatedly adjust the angle of the secondary battery in the predetermined angle increments until a target angle of less than 360 degrees is reached.

The computing part may be configured to extract boundary information on the outlines of opposite sides of the secondary battery from the images.

The rear lighting part may be configured to be surface-emitting.

The predetermined angle may be 3 degrees or less.

The 3D scanning apparatus may further include a coaxial lighting part configured to emit light coaxially with the camera.

The computing part may generate length information of the secondary battery by extracting information of a first edge closest to the camera and information of a second edge farthest from the camera from the images.

The computing part may extract distance information between the first edge information and the second edge information based on the length information of the secondary battery, and may correct (calibrate) the 3D model of the secondary battery based on the distance information.

Another exemplary embodiment of the present disclosure provides a 3D scanning method for a cylindrical secondary battery, the 3D scanning method including: acquiring projection images while emitting light from behind the cylindrical secondary battery; extracting, by a computing part, length information, outer diameter information, and side boundary information from the projection images; and creating, by the computing part, a three-dimensional model of the secondary battery based on the extracted length information, outer diameter information, and boundary information.

In the acquiring of projection images, the projection images may be acquired by capturing the secondary battery each time the secondary battery is adjusted by a predetermined angle.

In the acquiring of projection images, the projection images may be acquired by rotating the cylindrical secondary battery around a longitudinal axis until a target angle of 360 degrees or less is reached.

In the extracting of information, information on two boundaries on the side of the secondary battery may be extracted from the projection images.

In the creating of a three-dimensional model, a portion of the cylindrical secondary battery may be 3D-modeled based on the boundary information extracted for each predetermined angle.

The acquiring of projection images may be performed together with the emission of light from behind the secondary battery by surface emission.

The predetermined angle may be 3 degrees or less.

The acquiring of projection images may be performed while additionally emitting light coaxially with the camera.

The extracting of information may further include extracting distance information between a first edge identified by coaxial light and a second edge identified by light from the back, on upper and lower surfaces of the secondary battery, respectively, from the projection images.

The creating of a three-dimensional model may further include calculating the angle of displacement of the secondary battery based on the length information and the distance information.

Another exemplary embodiment of the present disclosure provides a 3D scanning apparatus for a cylindrical secondary battery, the 3D scanning apparatus including: a rest portion configured for a secondary battery seated thereon to rotate around a longitudinal axis; a rear lighting part configured to emit light toward the side of the secondary battery; a camera provided opposite the rear lighting part, with the secondary battery interposed therebetween; a front lighting part configured to emit light toward the side of the secondary battery; a controller configured to control the rest portion and the camera so as to acquire an image of the secondary battery for each rotation of the secondary battery by a predetermined angle; and a computing part configured to process an image acquired from the camera, wherein the computing part is configured to extract points on the outline of the secondary battery from images of the secondary battery for respective angles and reconstruct a three-dimensional model, and is configured to generate an inspection image by extracting surface portions of the secondary battery from images of the secondary battery for respective angles.

The front lighting part may be configured to emit light from at least one different position along the lengthwise direction of the secondary battery.

The controller may be configured to control the rest portion and the camera so as to acquire a projection image for each rotation of the secondary battery by a first angle, and may be configured to control the front lighting part and the camera so as to acquire a side image for each rotation of the secondary battery by a second angle.

The first angle may be smaller than the second angle.

The computing part may be configured to generate a partial inspection image by cropping portions of the side of the secondary battery from a plurality of images acquired from each rotation of the secondary battery by the second angle and merging the cropped portions together.

The computing part may be configured to generate a full-side inspection image by combining partial inspection images for respective second angles.

The 3D scanning apparatus may further comprise a defect detecting part configured to detect appearance defects by analyzing an inspection image of the side of the secondary battery.

The computing part may be configured to extract boundary points on the side from the image and create a three-dimensional model based on the angle of the secondary battery lies and the boundary points.

The computing part may be configured to extract the coordinates of pixels defining a boundary in order to extract boundary points on the side of the secondary battery.

The controller may set the first angle to be smaller than the second angle.

A 3D scanning and appearance inspection apparatus for a cylindrical secondary battery according to the present disclosure has the effect of maximizing inspection efficiency by performing 3D scanning and appearance inspection simultaneously while rotating the secondary battery.

4

Figure 6:
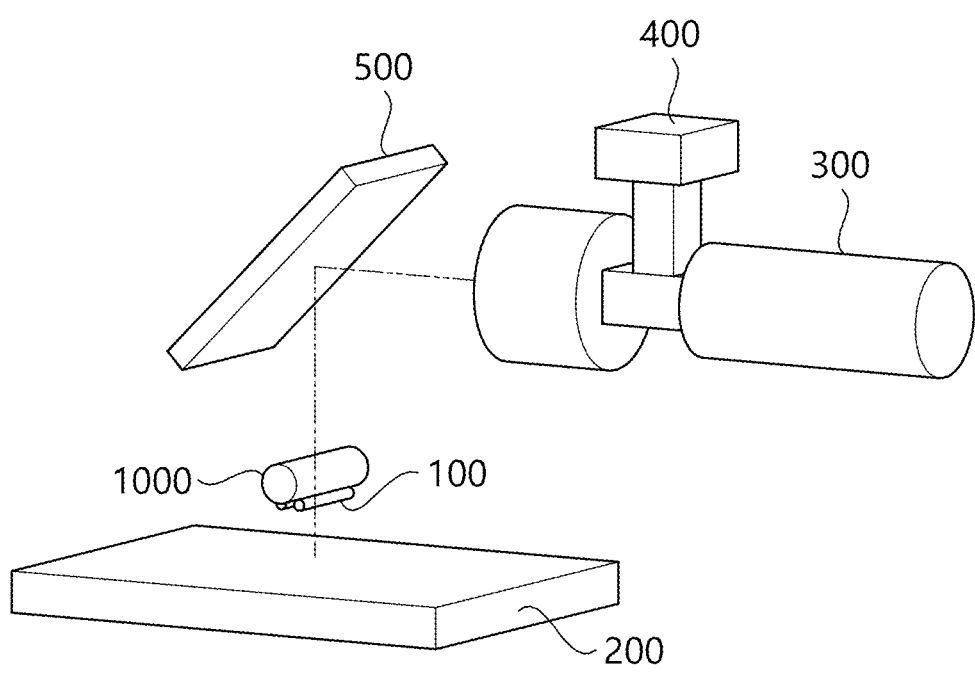

FIG. 6 is a perspective view of a 3D scanning apparatus for a cylindrical secondary battery according to a second embodiment of the present disclosure.

Figure 7:
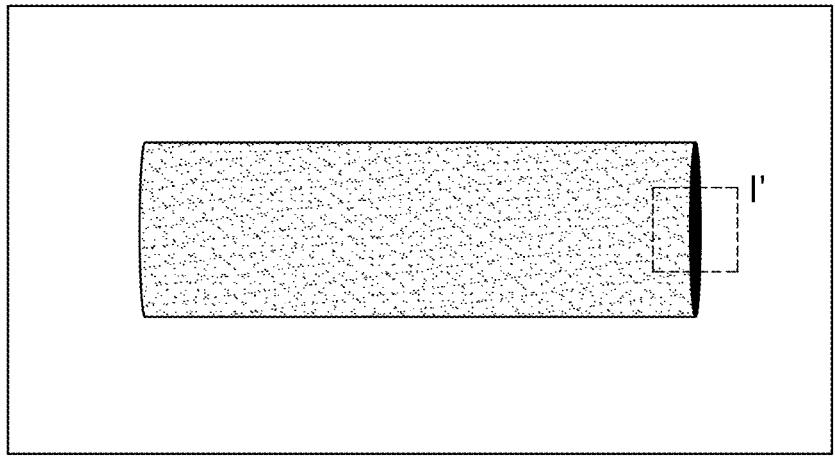

FIG. 7 is a view illustrating an example of an image acquired according to the second embodiment of the present disclosure.

Figure 8:
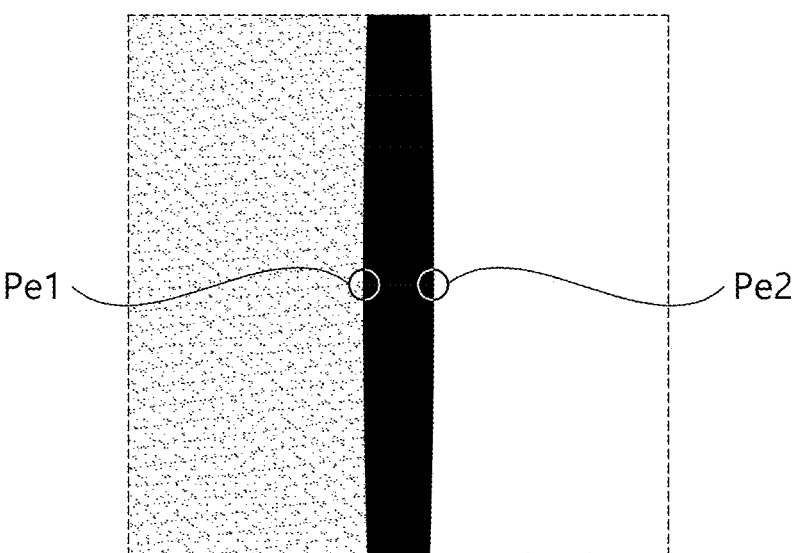

FIG. 8 is a view illustrating a concept of extracting points in the region I of FIG. 7 in order to compensate for a displacement according to the second embodiment.

Figure 9:
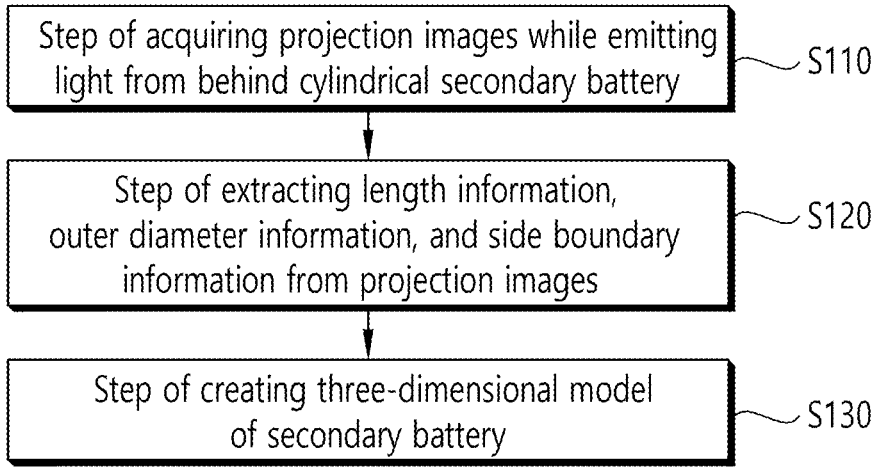

FIG. 9 is a flowchart of a 3D scanning method for a cylindrical secondary battery according to a third embodiment of the present disclosure.

FIG. 10 is a flowchart of a 3D scanning method for a cylindrical secondary battery according to a fourth embodiment of the present disclosure.

Figure 11:
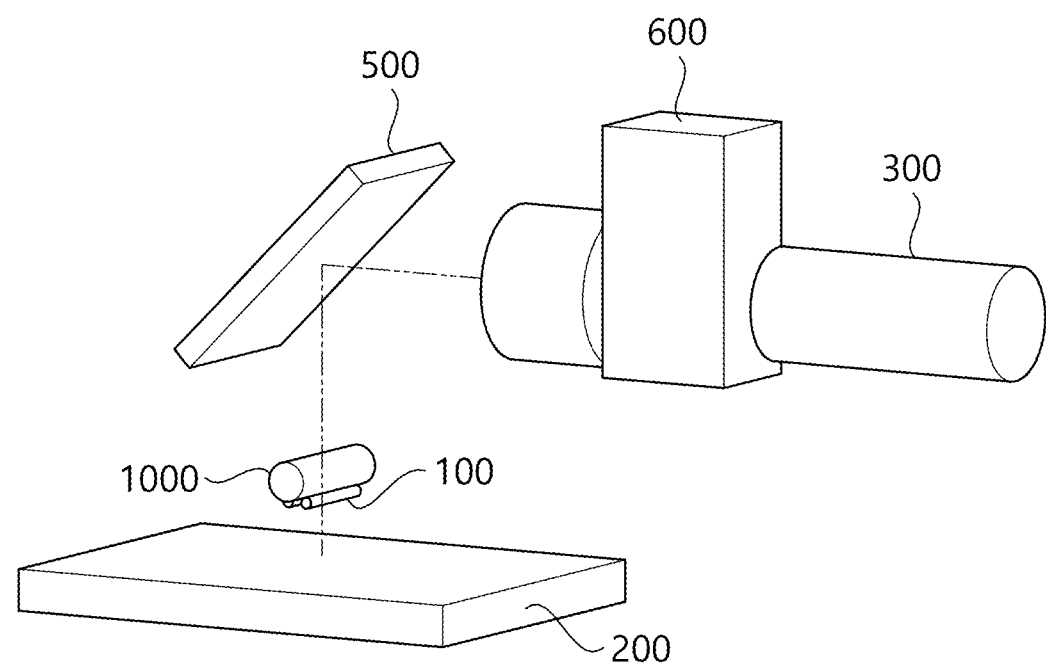

FIG. 11 is a perspective view of a 3D scanning and appearance inspection apparatus for a cylindrical secondary battery according to a fifth embodiment of the present disclosure.

Figure 12:
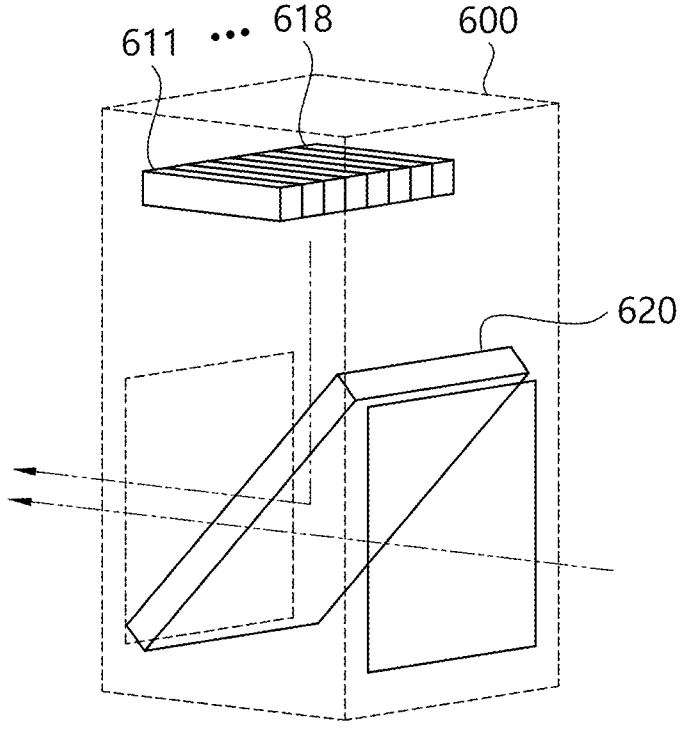

FIG. 12 is a view illustrating a front lighting part according to the fifth embodiment of the present disclosure.

Figure 13A:
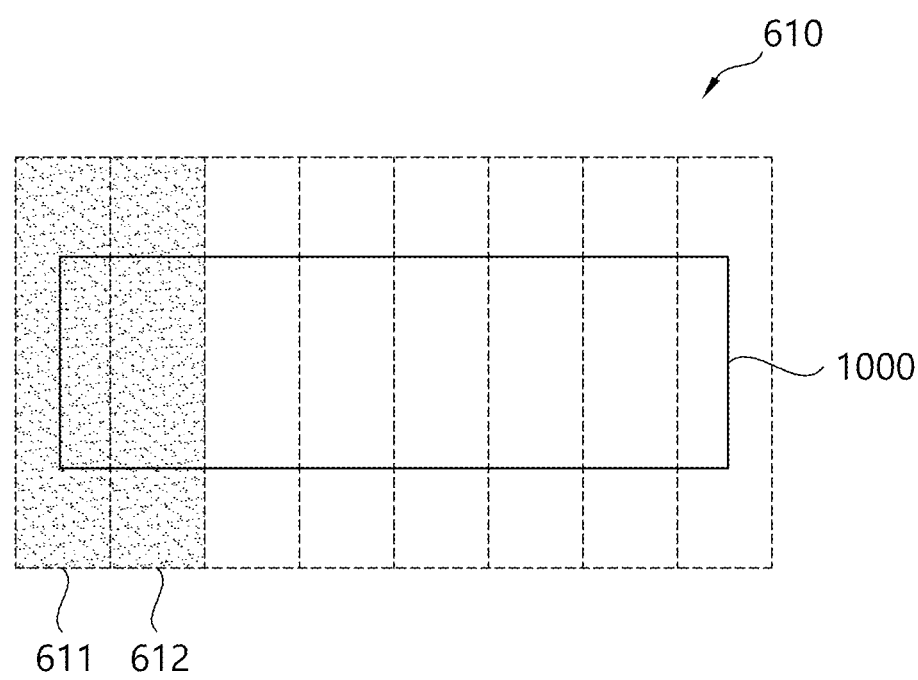
Figure 13B:
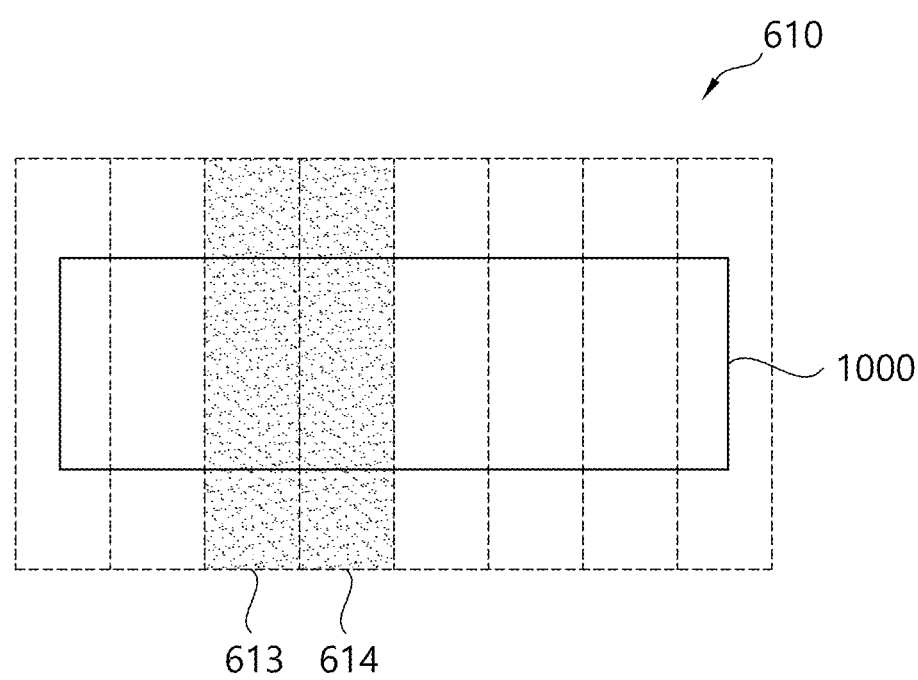
Figure 13C:
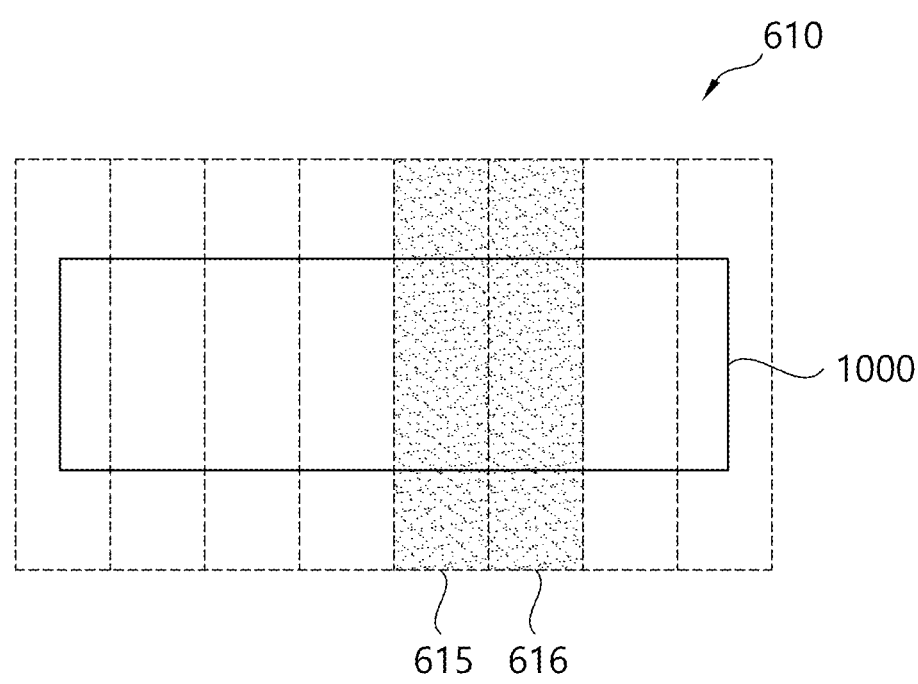

FIGS. 13A, 13B, and 13C are views illustrating an operating state of the front lighting part according to the fifth embodiment of the present disclosure.

Figure 14A:
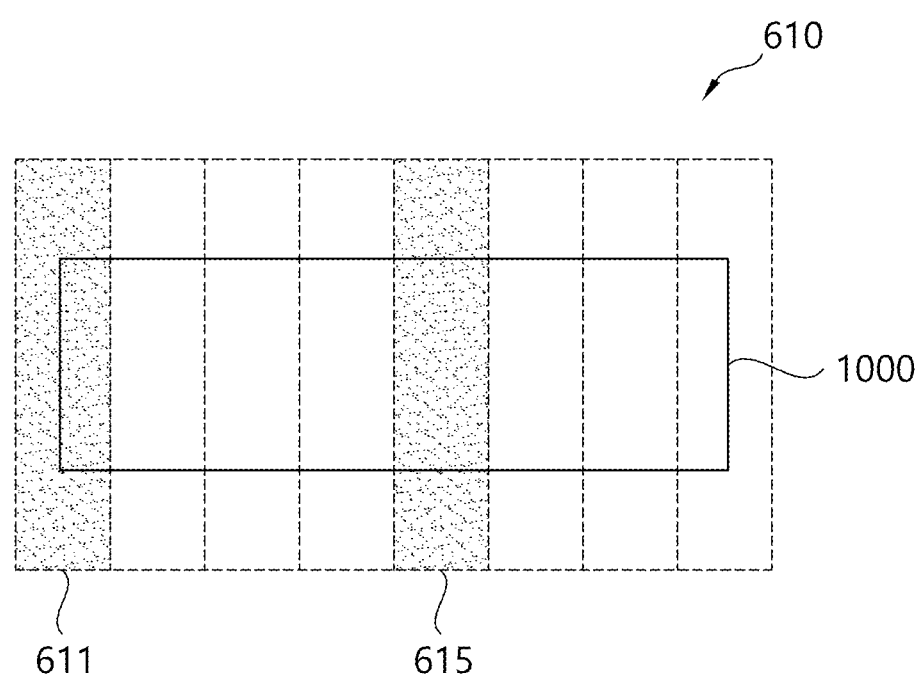
Figure 14B:
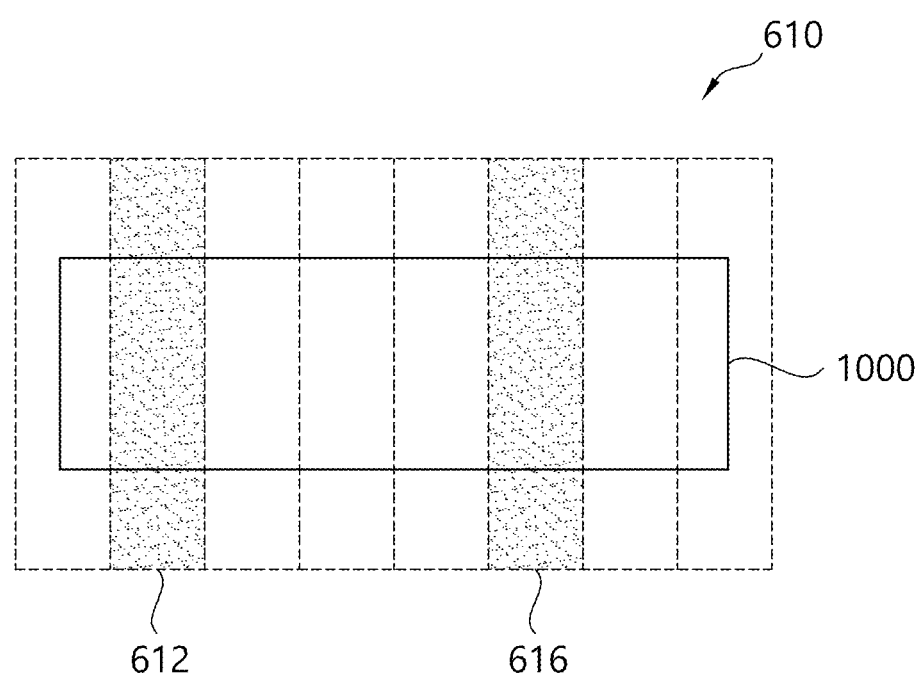
Figure 14C:
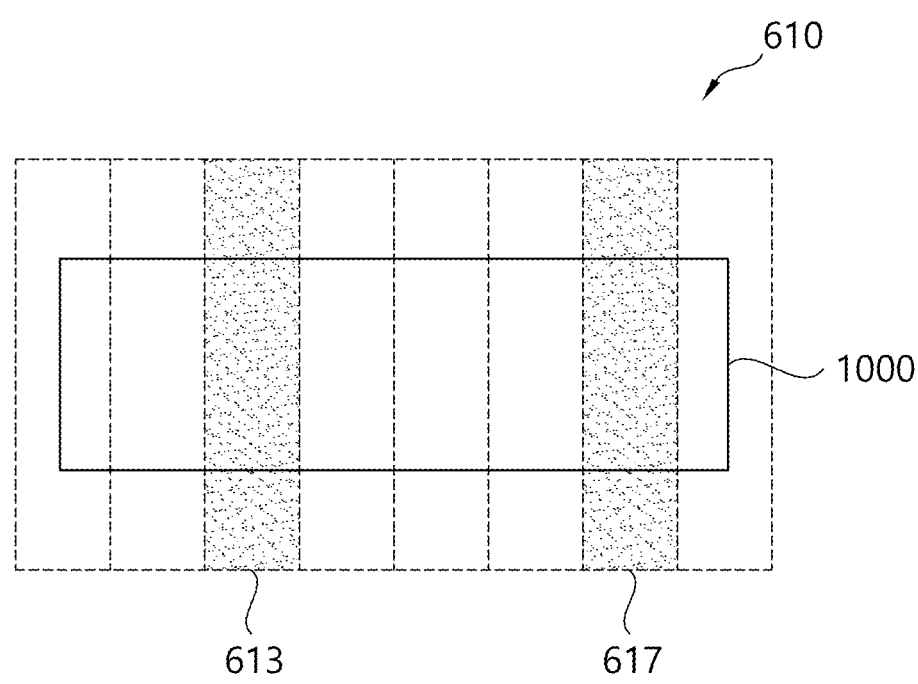

FIGS. 14A, 14B, and 14C are views illustrating another operating state of the front lighting part according to the fifth embodiment of the present disclosure.

Figure 15:
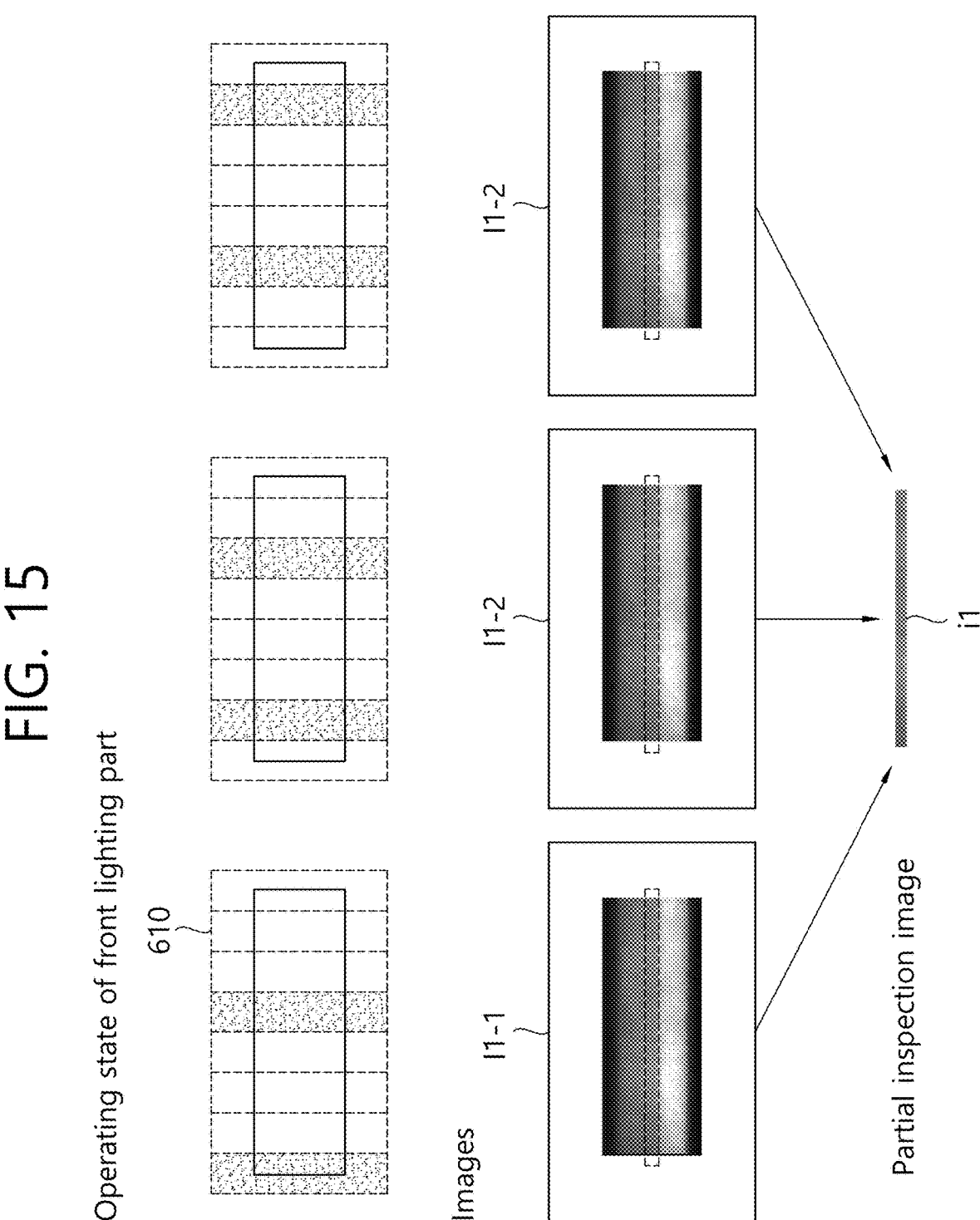

FIG. 15 is a conceptual diagram illustrating a concept of creating a partial inspection image according to the fifth embodiment of the present disclosure.

Figure 16:
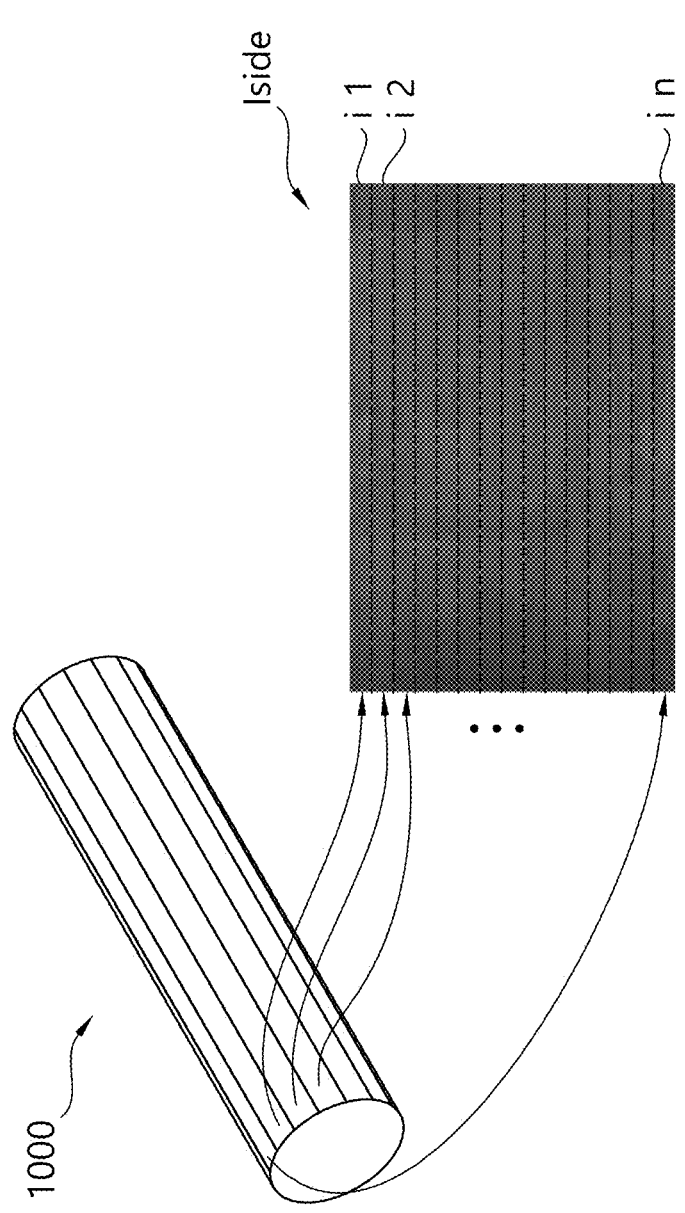

FIG. 16 is a conceptual diagram illustrating a concept of generating an inspection image according to the fifth embodiment of the present disclosure.

DETAILED DESCRIPTION

Hereinafter, a 3D scanning and appearance inspection apparatus for a cylindrical secondary battery according to the present disclosure will be described in detail with reference to the accompanying drawings. Furthermore, in the following description of the embodiments, elements may be named differently in the field to which the present invention pertains. However, if the elements have functional similarity and identity, they may be considered to be equivalent elements although they adopt modified embodiments. Furthermore, reference numerals assigned to respective elements are written for convenience of description. However, contents shown in the drawings in which the reference numerals are written do not restrict respective elements to the ranges in the drawings. Likewise, although the elements in the drawings adopt partially modified embodiments, they may be considered to be equivalent elements if the elements have functional similarity and identity. Furthermore, a description of an element is omitted if the element is recognized as being an element that must be naturally included in view of the level of a person having ordinary skill in the art.

Figure 1:
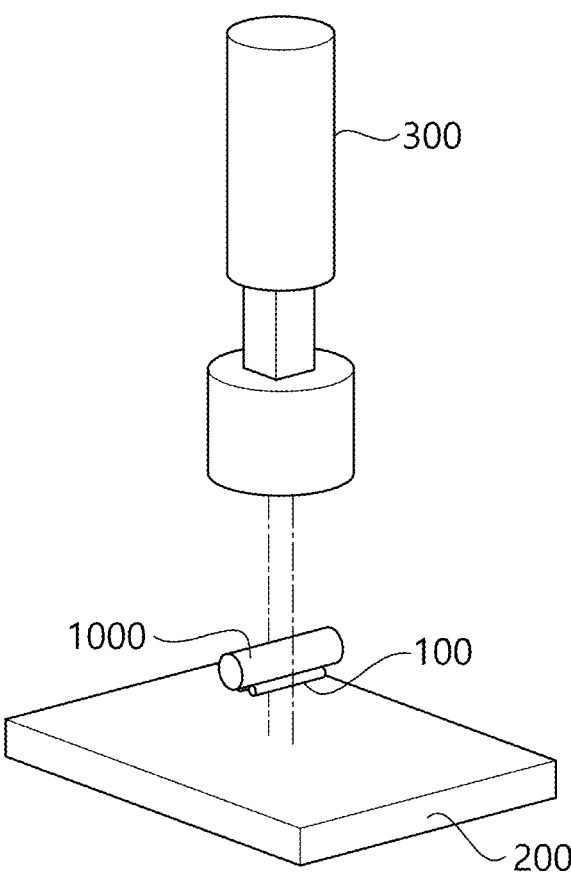
FIG. 1 is a perspective view of a 3D scanning apparatus for a cylindrical secondary battery according to a first embodiment of the present disclosure.

FIG. 1 is a perspective view of a 3D scanning apparatus 1 for a cylindrical secondary battery 1000 according to a first embodiment of the present disclosure.

Referring to FIG. 1, the 3D scanning apparatus 1 for the cylindrical secondary battery 1000 according to the first embodiment of the present disclosure may include a rest portion 100, a driving part (not shown), a rear lighting part 200, a camera 300, a controller (not shown), and an computing part (not shown).

The 3D scanning apparatus 1 for the cylindrical secondary battery 1000 according to the first embodiment of the present disclosure may be configured to acquire an outline image projected of the secondary battery 100 when the secondary battery 1000 is illuminated from the back.

The rest portion 100 is configured in such a way that the cylindrical secondary battery 1000 is seated on it in a lying position. The rest portion 100 may be configured in such a way as to be disposed within an area where the secondary battery 1000 is projected when the camera 300 captures an image. That is, the rest portion 100 may be configured not to appear on the image when the camera 300 captures an image.

The driving part may be configured to cause the cylindrical secondary battery 1000 seated on the rest portion 100 to rotate around a longitudinal axis. Here, the driving part is configured to repeatedly adjust the angle of the secondary battery 1000 by a predetermined angle. The driving part may be configured to cause the secondary battery 1000 to rotate 0.1 to 3 degrees per operation.

The rear lighting part 200 and the camera 300 may be provided on opposite sides with respect to the rest portion 100. The rear lighting part 200 is configured to emit light toward the secondary battery 1000 seated on the rest portion 100. The rear lighting part 200 is configured to be surface-emitting. That is, the rear lighting part 200 may function as a backlight for the secondary battery 1000.

The camera 300 is configured to acquire a projected image as light emitted by the rear lighting part 200 is blocked by the secondary battery 1000. The camera 300 may be configured as an area camera 300 to acquire a planar image.

Although not shown, the 3D scanning apparatus 1 for the cylindrical secondary battery 1000 according to the first embodiment of the present disclosure may further include a controller and a computing part.

The controller is configured to control overall operation of the apparatus. Specifically, the controller is configured to cause the rear lighting part 200 and the camera 300 to operate in synch with each other. Also, the controller is configured to control the driving part in order to adjust the angle of the secondary battery 1000. Thus, the camera 300 is configured to acquire an image while the backlight is turned on, with each variation of the angle of the secondary battery 1000.

The computing part is configured to extract boundary points from a plurality of images acquired from the camera 300 and perform 3D modeling. The dimensions of the secondary battery 1000 to be 3D scanned may be inputted in advance into the computing part. That is, information on the dimensions of the secondary battery 1000, such as the outer diameter and length, may be predetermined in the manufacturing stage and inputted into the 3D scanning apparatus 1 according to the embodiment of the present disclosure.

The computing part may change the scale of points shown on the image and perform modeling, based on the pre-inputted information on the secondary battery 1000.

Figure 2A:
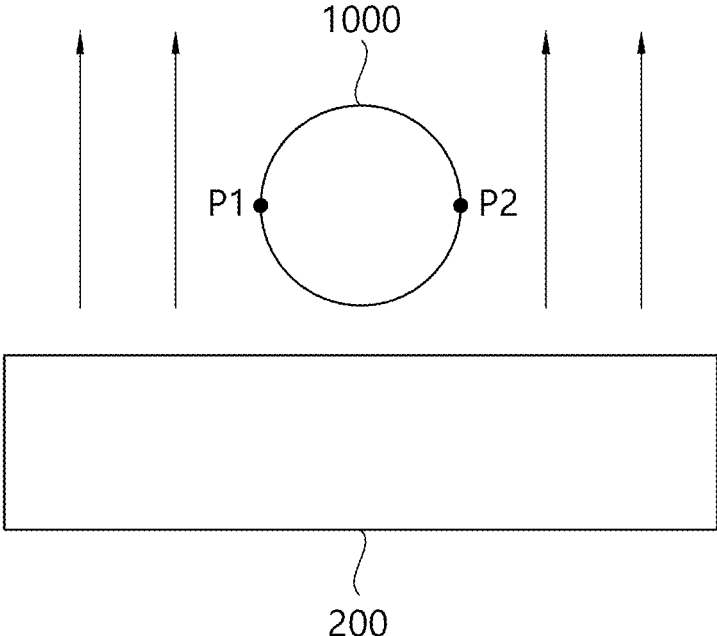
FIGS. 2A and 2B are views showing an operating state according to the first embodiment.
Figure 2B:
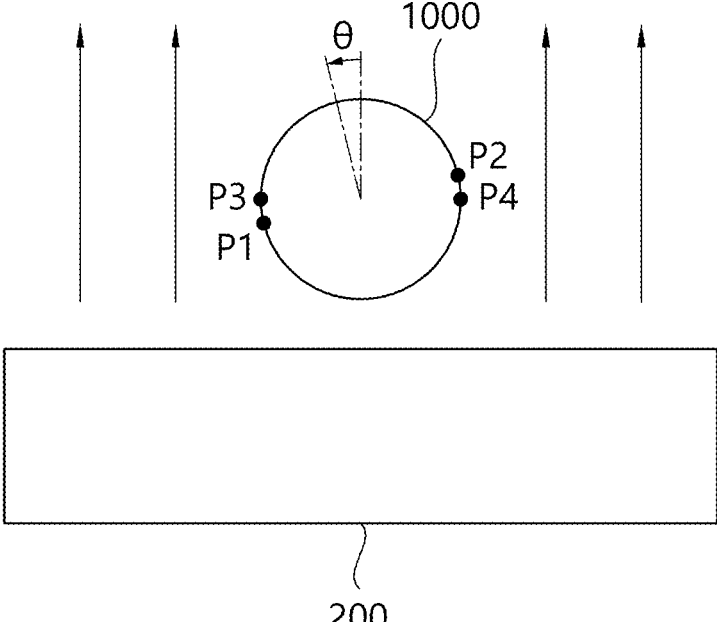

FIGS. 2A and 2B are views showing an operating state according to the first embodiment. These drawings only depict the posture of the secondary battery 1000 and the rear lighting part 200 for the convenience of explanation.

Referring to FIG. 2A, in the first embodiment of the present disclosure, the rear lighting part 200 is turned on to acquire an image, while the second battery 1000 is off. At this time, a projection image of the secondary battery 1000 is acquired. The coordinates of the farthest points P1 and P2 on a curved line in the cross section can be found from the projection image. Also, the boundary coordinates of the top surface and the bottom surface can also be confirmed.

Referring to FIG. 2B, the controller causes the secondary battery 1000 to rotate by a predetermined angle and then turns on the rear lighting part 200 to acquire an image. In this instance, points P3 and P4 which are obtained from the boundary around the side when the secondary battery 1000 is projected are displaced by 180 degrees apart. The scanning apparatus 1 according to the present disclosure causes the secondary battery 1000 to rotate by 180 degrees while repeating the process shown in FIGS. 2A and 2B several to several hundreds of times. Since points are extracted from opposite boundaries parallel to each other as the secondary battery 1000 is rotated by 180 degrees, it is therefore possible to extract points from the entire boundary around the side, covering a full 360-degree angle.

Figure 3:
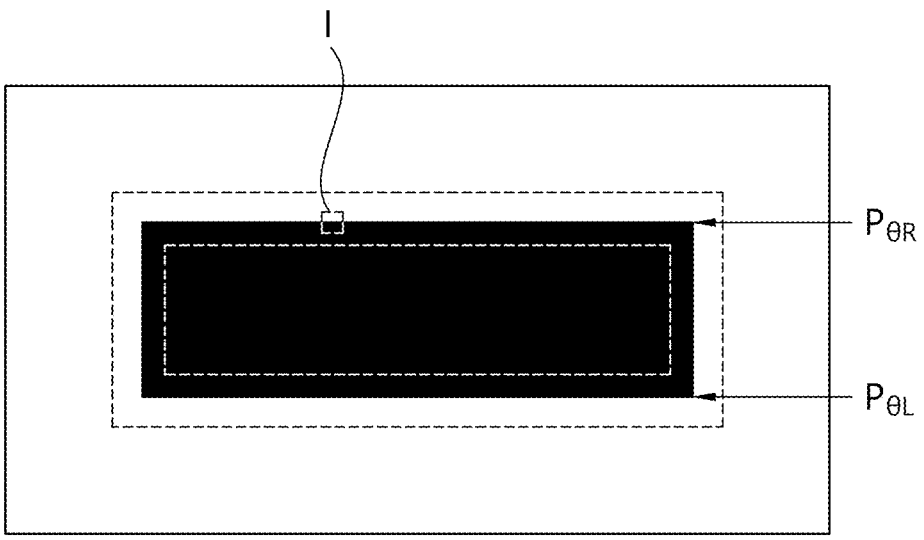
FIG. 3 is a view illustrating an example of an image acquired according to the first embodiment.

FIG. 3 is a view illustrating an example of an image acquired according to the first embodiment.

Referring to FIG. 3, in the first embodiment, a simple projection image of the secondary battery 1000 may be acquired while the backlight is on. In this instance, points P$\theta$R can be extracted from the right boundary according to the angle $\theta$ of rotation extracted from the side boundary shown in an upper part of FIG. 3. Also, points P$\theta$L can be extracted from the left boundary.

Figure 4:
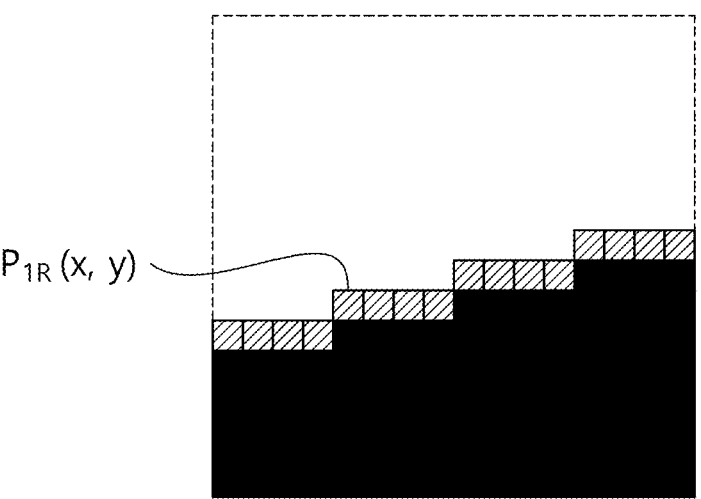
FIG. 4 is an enlarged view of the region I of FIG. 3.

FIG. 4 is an enlarged view of the region I of FIG. 3.

Referring to FIG. 4, the computing part identifies boundary points on a pixel-by-pixel basis, from an image that is acquired for a first angle $\theta 1$. When viewing the enlarged region I for the first angle, the right boundary may be identified by pixel by pixel. The x and y coordinates of each pixel may be found. The computing part extracts boundary points on a pixel-by-pixel basis on the right and left boundaries in each acquired image. The process in which the computing part extracts boundary points may be performed for each of a plurality of images.

For example, if the controller causes the secondary battery 1000 to rotate in 1 degree increments, 180 images may be acquired by means of the camera 300. The computing part extracts points on the left and right boundaries in each of the 180 images.

FIGS. 5A, 5B, 5C, and 5D are views illustrating a concept of modeling using three-dimensional points.

Figure 5A:
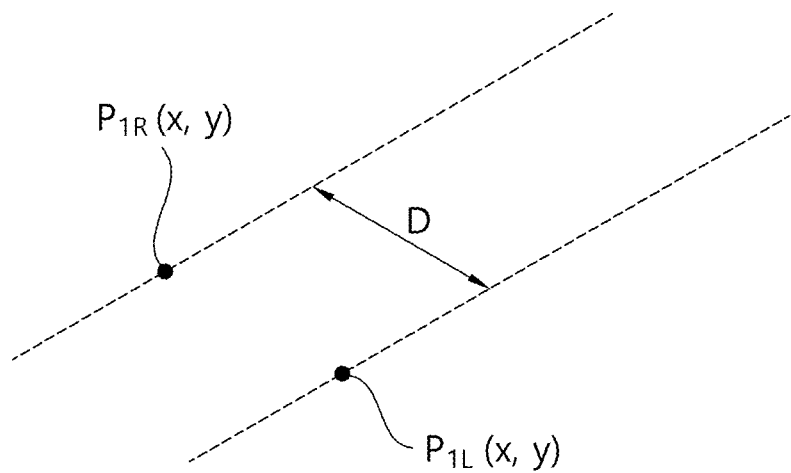
FIGS. 5A, 5B, 5C, and 5D are views illustrating a concept of modeling using three-dimensional points.

Referring to FIG. 5A, the computing part extracts boundary points for the first angle. The extracted points may be three-dimensionally represented as shown in FIG. 5A. Points $P_{1R}(x,y)$ extracted from the right boundary for the first angle may be represented. Also, points extracted from the left boundary may be represented in a three-dimensional space. At this time, the scale of the three-dimensional space may be adjusted depending on the diameter of the secondary battery 1000 which is pre-inputted. The scale adjustment may be performed by matching the radius D/2 from the center of rotation of the secondary battery 1000, a rotating coordinate system for each angle of rotation, and extracted points.

Figure 5B:
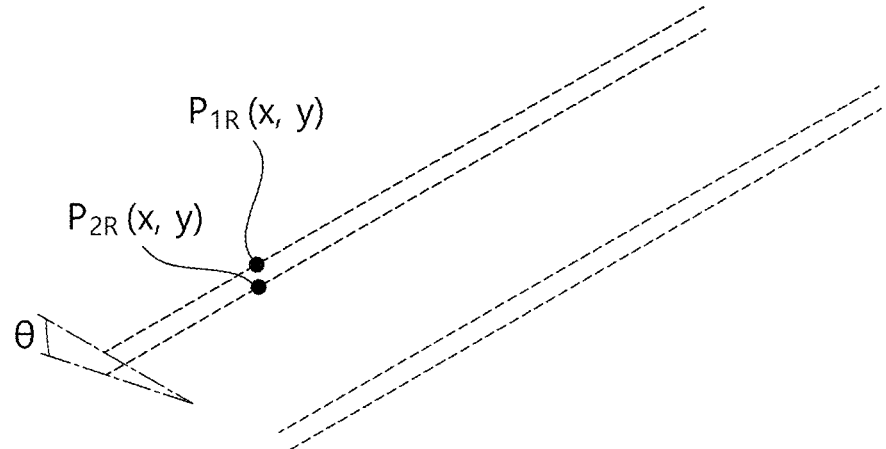

Referring to FIG. 5B, when the secondary battery 1000 is placed at a second angle, points $P_{1R}(x,y)$ and $P_{2R}(x,y)$ may be extracted from the right boundary and represented in a three-dimensional space. Likewise, points extracted from the left boundary spaced 180 degrees apart from those on the right boundary may be represented in a three-dimensional space.

Figure 5C:
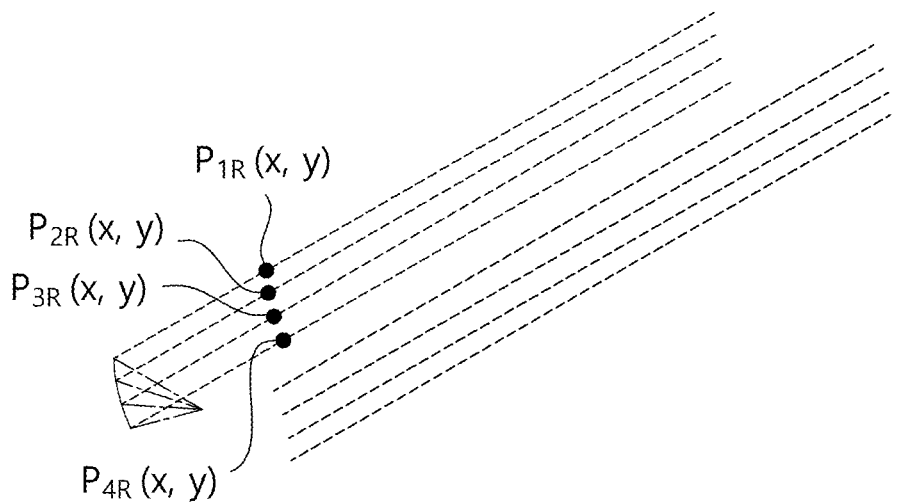

Referring to FIG. 5C, three-dimensional points are generated along the angle of rotation as the processes explained with reference to FIGS. 5A and 5B are repeated. The points $P_{1R}(x,y)$, $P_{2R}(x,y)$, $P_{3R}(x,y)$, and $P_{4R}(x,y)$ extracted from the right boundary may be represented at positions that are spaced apart at intervals of a predetermined angle (the angle of rotation of the secondary battery 1000) from the central axis.

Figure 5D:
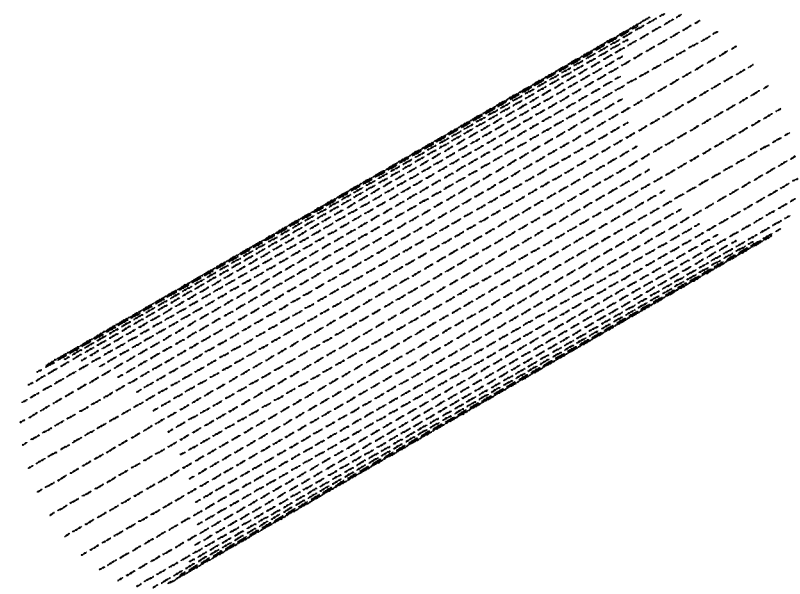

Referring to FIG. 5D, since the point extraction process is completed by rotating the secondary battery 1000 by only 180 degrees, the computing part may generate three-dimensional data for a full 360-degree angle.

As explained above, in the present disclosure, the three-dimensional scanning of the secondary battery 1000 may be performed by creating a three-dimensional model using points extracted from a projection image. In this instance, points extracted using a single camera 300 can be merged into 3D data, thereby simplifying the equipment.

While the present embodiment has been described with an example in which three-dimensional data is created by rotating the secondary battery 1000 by 180 degrees, it may be modified and practiced in such a manner that three-dimensional data is created by rotating the secondary battery 1000 by 360 degrees or more.

Moreover, although the present embodiment has been described with an example in which a single cylindrical battery is captured, this is merely an example and the scanning apparatus 1 according to the present disclosure may be modified and practiced in such a manner that varying numbers of secondary batteries 1000 are simultaneously rotated and simultaneously captured.

The computing part may perform appearance defect detection by using three-dimensional information generated of the secondary battery 1000.

Hereinafter, a 3D scanning apparatus 1 for a cylindrical secondary battery 1000 according to a second embodiment of the present disclosure will be described with reference to FIGS. 6 to 8. The 3D scanning apparatus 1 according to this embodiment may include the same components as the foregoing first embodiment, and it is to be noted that descriptions of the same components will be omitted in order to avoid redundant explanation, and only the differences will be described in detail.

If there is no coaxial lighting depending on the geometry of the cylindrical shape, images may be acquired in a symmetrical fashion, making it impossible to find out which direction the secondary battery 1000 is turned toward. Moreover, even with a misalignment (ex. yawing) of the secondary battery 1000, points along the boundary the side surface may look no different on a projection image. Accordingly, the second embodiment is implemented in such a way as to detect a misalignment of the secondary battery 1000 and create and correct (calibrate) a 3D model based on the detected turn.

FIG. 6 is a perspective view of a 3D scanning apparatus 1 for a cylindrical secondary battery 1000 according to a second embodiment of the present disclosure.

Referring to FIG. 6, the 3D scanning apparatus 1 for the cylindrical secondary battery 1000 according to the second embodiment of the present disclosure may further include a mirror part 500 and a coaxial lighting part 400. The coaxial lighting part 400 may include a beam splitter and a lighting module.

The mirror part 500 may be provided in an area captured by the camera 300, and the camera 300 may acquire a projection image of the secondary battery 1000 which appears when it is reflected off the mirror part 500.

The coaxial lighting part 400 is configured to emit light toward the side of the secondary battery 1000 which is captured by the camera 300.

The controller is configured to control the coaxial lighting part 400, the rear lighting part 200, the camera 300, and the driving part. The controller may control the camera 300 to acquire an image when the coaxial lighting part 400 and the rear lighting part 200 simultaneously emit light toward the secondary battery 1000.

In the present embodiment, it is possible to extract boundary information acquired when light is emitted from behind the secondary battery 1000 and boundary information of one half of the side surface of the secondary battery 1000 facing the camera 300. The computing part may calculate displacement information if boundary points on the front half surface and the rear half surface are different, and three-dimensional model information may be corrected based on the calculated displacement information.

It should be noted that, while the present embodiment provides the mirror part 500 as an additional component, the mirror part may be omitted.

FIG. 7 is a view illustrating an example of an image acquired according to the second embodiment of the present disclosure.

Referring to FIG. 7, in the second embodiment, the edge of the front half surface (the surface facing the camera 300) of the secondary battery 1000 may be detected by using coaxial lighting.

Accordingly, in this embodiment, an image is acquired as light is emitted by using coaxial lighting. The computing part may extract points on the edge of upper and lower surfaces facing the camera 300 in the acquired image.

FIG. 8 is a view illustrating a concept of extracting points in the region I of FIG. 7 in order to compensate for a displacement according to the second embodiment.

Referring to FIG. 8, the computing part extracts a point Pe1 on a first edge which is closest to the camera 300 from among points identified by coaxial lighting. Also, the computing part extracts a point Pe2 on a second edge which is farthest from the camera 300 from among points identified by the rear lighting part 200. In this case, the point closest to or farthest from the camera 300 may be selected as a point on a boundary intersecting the transverse axis.

The computing part calculates how many degrees the secondary battery 1000 is misaligned toward the camera 300 by using pre-inputted information, i.e., the diameter of the upper or lower surface of the secondary battery 1000 and the distance between the first edge and the second edge. Based on misalignment angle of the secondary battery 1000, 3D data for the secondary battery 1000 explained in the first embodiment will be corrected.

Hereinafter, a 3D scanning method for a cylindrical secondary battery according to a third embodiment of the present disclosure will be described in detail with reference to FIG. 9.

FIG. 9 is a flowchart of a 3D scanning method for a cylindrical secondary battery according to a third embodiment of the present disclosure.

Referring to FIG. 9, the 3D scanning method for the cylindrical secondary battery according to the third embodiment of the present disclosure may include the step S110 of acquiring projection images while emitting light from behind the cylindrical secondary battery, the step S120 of extracting length information, outer diameter information, and side boundary information from the projection images, and the step S130 of creating a three-dimensional model of the secondary battery.

The step S110 of acquiring projection images while emitting light from behind the cylindrical secondary battery may be performed by emitting light from behind the secondary battery and acquiring images using a camera on the other side. This step may be repeatedly performed by rotating the secondary battery at a predetermined angle. That is, through this step, tens or hundreds of images of the secondary battery may be acquired.

The step S120 of extracting length information, outer diameter information, and side boundary information from the projection images corresponds to the step of obtaining length information, outer diameter information, and side boundary information of the secondary battery by extracting boundary points from the projection images. The projection images may be acquired while the secondary battery is fixed in the same position. Thus, a pixel size identified from the images based on pre-inputted reference values may match the actual size. Based on this, information on the length and outer diameter of the secondary battery may be extracted, and information on the boundary (two lines) around the side may be extracted.

The step S130 of creating a three-dimensional model of the secondary battery corresponds to the step of performing three-dimensional modeling based on the extracted length information, outer diameter information, and side boundary information. In this step, points are extracted as the cylindrical secondary battery is rotated, and therefore side boundary points extracted for each predetermined angle may be three-dimensionally reconstructed.

Hereinafter, a 3D scanning method for a cylindrical secondary battery according to a fourth embodiment of the present disclosure will be described in detail with reference to FIG. 10.

FIG. 10 is a flowchart of a 3D scanning method for a cylindrical secondary battery according to a fourth embodiment of the present disclosure.

In this embodiment, the term "projection image" may mean an image that is acquired when light is emitted from the front as well as from the back.

Referring to FIG. 10, the 3D scanning method for the cylindrical secondary battery according to the fourth embodiment of the present disclosure may include the step S210 of acquiring projection images while emitting light coaxially with the back of the cylindrical secondary battery and the camera, the step S220 of extracting length information, outer diameter information, and side boundary information from the projection images, the step S230 of calculating the angle of displacement of the secondary battery, and the step S240 of creating a three-dimensional model of the secondary battery. Here, the steps of extracting information and creating a three-dimensional model may be performed by a computing part including a processor.

The step S210 of acquiring projection images while emitting light coaxially with the back of the cylindrical secondary battery and the camera corresponds to the step of emitting light from the front and back of the secondary battery and acquiring images.

The step S220 of extracting length information, outer diameter information, and side boundary information corresponds to the step of extracting the coordinates of pixels on a boundary by processing the images. In this step, the edge of the upper or lower surface illuminated with light from the front of the secondary battery may be identified.

In particular, if the secondary battery is turned toward the camera, a point on the edge of the upper or lower surface illuminated with light from the front and a point on the edge of the upper or lower surface illuminated with light from the back may be identified simultaneously. In this instance, the computing part may extract a point on the edge which is farthest from the camera and a point on the edge which is closest to the camera and find information on the distance between the two points. However, these points may not be extracted unless the secondary battery is placed in the right position without displacement, and the distance information may be zero.

The step S230 of calculating the angle of displacement of the secondary battery is the step of calculating the amount of displacement of the secondary battery toward the camera by using the outer diameter information and distance information of the secondary battery.

The step S240 of creating a three-dimensional model of the secondary battery corresponds to the step of correcting a three-dimensional model of the side of the secondary battery based on the angle of displacement of the secondary battery. Through this step, the angle of displacement may be easily found even if the secondary battery is not placed in the right position toward the camera. Also, an accurate three-dimensional model may be created based on the angle of displacement of the secondary battery.

As explained above, a 3D scanning apparatus and 3D scanning method for a cylindrical secondary battery according to the present disclosure make it possible to reconstruct an accurate three-dimensional model of the cylindrical secondary battery by means of a simple construction with a single camera.

Hereinafter, a 3D scanning and appearance inspection apparatus for a secondary battery according to a fifth embodiment of the present disclosure will be described in detail with reference to FIGS. 11 to 16. The 3D scanning and appearance inspection apparatus according to this embodiment may include the same components as the foregoing embodiments, and it is to be noted that descriptions of the same components will be omitted in order to avoid redundant explanation, and only the differences will be described in detail.

FIG. 11 is a perspective view of a 3D scanning and appearance inspection apparatus for a cylindrical secondary battery according to a fifth embodiment of the present disclosure. FIG. 12 is a view illustrating a front lighting part according to the fifth embodiment of the present disclosure.

Referring to FIGS. 11 and 12, the 3D scanning and appearance inspection apparatus for the secondary battery according to the fifth embodiment of the present disclosure may include a front lighting part 600. The front lighting part 600 may be configured to emit light toward the secondary battery coaxially with the camera. The front lighting part 600 may include a beam splitter 620 and a front lighting module 610. The beam splitter may be provided at a position where the camera and the optical axis of the front lighting module 610 intersect.

The front lighting module 610 may include a plurality of lighting units 611, 612, . . . , 618. The plurality of lighting units may be sequentially provided along the lengthwise direction of the secondary battery. Each lighting unit may be made with a predetermined width. Also, each lighting unit 611, 612, . . . , 618 may be configured to be controlled independently by the controller. Although the front lighting module 610 is illustrated by way of example as including eight lighting units, this is merely an example and the number of lighting units may vary.

In the fifth embodiment of the present disclosure, the controller may control the secondary battery to rotate in increments of a predetermined angle. The controller may control the camera to acquire a projection image for 3D scanning for each rotation of the secondary battery by a first angle. Moreover, the controller may control the camera in order to acquire a surface image for each rotation of the secondary battery 1000 by a second angle. The controller may set the first angle to be smaller than the second angle. That is, an image captured for 3D scanning may be controlled in such a way that points are extracted more frequently in order to create an accurate 3D model.

The computing part may extract boundary points on the side of the secondary battery from acquired projection images and create a 3D model based on the boundary points. However, the functions or methods explained in the above-described first to fourth embodiments may be used in relation to the creation of a 3D model by the computing part.

It should be noted that, while the present embodiment provides the mirror part 500 as an additional component, the mirror part may be omitted.

In this embodiment, the computing part may generate an inspection image by capturing the side of the secondary battery for respective angles and combining the captured images. Also, an appearance inspection apparatus may detect defects on the side of the secondary battery by analyzing the generated inspection image. Examples of the defects may include scratches, dents, contaminations, foreign matter, and leaks.

FIGS. 13A, 13B, and 13C are views illustrating an operating state of the front lighting part according to the fifth embodiment of the present disclosure. FIGS. 14A, 14B, and 14C are views illustrating another operating state of the front lighting part according to the fifth embodiment of the present disclosure.

Referring to FIGS. 13A, 13B, and 13C, the front lighting module 610 includes a plurality of lighting units, and the lighting units may be consecutively provided along the lengthwise direction of the secondary battery. In this case, the lighting units may be controlled in such a manner that, for example, two adjacent lighting units in a predetermined area are simultaneously turned on at a time. Each two adjacent lighting units may be controlled in the order: FIG. 13A, FIG. 13B, and FIG. 13C. That is, a first lighting unit 611 and a second lighting unit 612 may be turned on first and then a third lighting unit 613 and a fourth lighting unit 614 may be turned on. Afterwards, a fifth lighting unit 615 and a sixth lighting unit 616 may be turned on. The camera may acquire an image for each phase shift of the lighting turn-on position.

Referring to FIGS. 14A, 14B, and 14C, the front lighting module may be run in a variety of patterns and operate with a phase shift. As shown in FIG. 14A, the first lighting unit 611 and the fifth lighting unit 615 may be turned on simultaneously. Afterwards, the second lighting unit 612 and the sixth lighting unit 616 are simultaneously turned on in such a way that the turned-on lighting units are shifted in phase. Afterwards, the third lighting unit 613 and the seventh lighting unit 616 may be simultaneously turned on as shown in FIG. 14C. In this way, the camera may be activated to acquire an image of the secondary battery, for each phase shift in the front lighting module.

However, the construction of the front lighting module explained with reference to FIGS. 13A to 14C is merely an example, and varying numbers of lighting units may be configured in various patterns. That is, lighting units may be arranged in a 1×N array or an N×M array. Also, it should be contemplated that the operation pattern of the lighting units may be modified in various patterns in which phase shift is possible.

FIG. 15 is a conceptual diagram illustrating a concept of creating a partial inspection image according to the fifth embodiment of the present disclosure.

Referring to FIG. 15, the above-described front lighting module may complete one cycle when the secondary battery stops operating. With each cycle, the camera may acquire an image by capturing the secondary battery for each phase shift of the turn-on position of the lighting unit.

Thus, for a specific angle, it is possible to acquire as many images of the secondary battery as the number of phase shifts. For example, as shown in FIG. 15, a first phase image I1-1, a second phase image I1-2, and a third phase image I1-3 may be acquired when the secondary battery is at a first angle.

The computing part may crop and extract a flattest portion from each of the three images. Here, the flattest portion may correspond to a portion of the center of the image.

The computing part may generate a partial inspection image i1 by combining the extracted portions. Since such a partial inspection image is generated based on images acquired as the front lighting module is shifted in phase, it may represent accurate information on the level (able to assess surface irregularities, imperfections, etc.) of a portion of the surface. That is, once the computing part generates a partial inspection image i1, an image with depth information shown on a plane, as in 2.5D, may be acquired.

Meanwhile, while the above-described process of generating a partial inspection image has been described with an example in which a partial inspection image is created based on three images that are respectively acquired for three lighting phases, this is merely an example and the camera may be controlled to acquire a plurality of images for several or several tens of phases.

The controller may operate the front lighting part and the camera in this manner for each rotation of the secondary battery by a second angle. Also, the computing part may generate a partial inspection image for each rotation of the second battery by the second angle.

FIG. 16 is a conceptual diagram illustrating a concept of generating an inspection image according to the fifth embodiment of the present disclosure.

Referring to FIG. 16, in the first embodiment, the computing part may generate partial inspection images I1, I2, . . . , In for respective second angles. This process may be performed until the secondary battery completes a 360-degree rotation. A partial inspection image acquired for a certain angle may be merged side by side with partial inspection image acquired for a subsequent angle. In the end, the computing part may generate an inspection image Iside which fully shows the side of the secondary battery.

Although not shown, a defect detecting part may detect appearance defects from the side of the secondary battery based on an inspection image.

Incidentally, in the foregoing fifth embodiment, the controller is described as extracting outlines by rotating the secondary battery and acquiring a projection image for each first angle, and acquiring a surface image for each second angle. In this case, at least one of the projection image and the surface image may be acquired depending on how large the first angle and the second angle are. That is, in some cases, only a projection image may be acquired when the secondary battery is at a specific angle, and only a surface image may be acquired for another angle. Moreover, in some cases, both the projection image and surface image of the secondary battery may be simultaneously acquired.

As explained above, a 3D scanning and appearance inspection apparatus for a cylindrical secondary battery according to the present disclosure has the effect of maximizing inspection efficiency by performing 3D scanning and appearance inspection simultaneously while rotating the secondary battery.

What is claimed is:

1. A 3D scanning apparatus for a cylindrical secondary battery, the 3D scanning apparatus comprising:
   a rest portion configured for a secondary battery seated thereon to rotate around a longitudinal axis;
   a rear lighting part configured to emit light toward the side of the secondary battery;
   a camera provided opposite the rear lighting part, with the secondary battery interposed therebetween;
   a controller configured to control the rest portion and the camera so as to acquire an image of the secondary battery for each rotation of the secondary battery by a predetermined angle; and
   a computing part configured to extract points on the outline of the secondary battery from images of the secondary battery and reconstruct a three-dimensional model.

2. The 3D scanning apparatus of claim 1, wherein the rear lighting part is a backlight for the secondary battery, and the camera is configured to acquire a projection image of the secondary battery.

3. The 3D scanning apparatus of claim 2, wherein the computing part receives information on the predetermined angle by which the secondary battery is rotated, and reconstructs the three-dimensional model based on the diameter of the secondary battery and the points on the outline for each angle of the secondary battery.

4. The 3D scanning apparatus of claim 3, further comprising a driving part configured for the secondary battery seated thereon to rotate in a longitudinal direction,
   wherein the controller controls the driving part so as to repeatedly adjust the angle of the rest portion according to the predetermined angle up to the target angle of 360 degrees or less.

5. The 3D scanning apparatus of claim 4, wherein the computing part is configured to extract boundary information on the outlines of opposite sides of the secondary battery from the images.

6. The 3D scanning apparatus of claim 5, wherein the rear lighting part is configured to be surface-emitting.

7. The 3D scanning apparatus of claim 6, wherein the predetermined angle is 3 degrees or less.

8. The 3D scanning apparatus of claim 1, further comprising a coaxial lighting part configured to emit light coaxially with the camera.

9. The 3D scanning apparatus of claim 8, wherein the computing part generates length information of the secondary battery by extracting information of a first edge closest to the camera and information of a second edge farthest from the camera from the images.

10. The 3D scanning apparatus of claim 9, wherein the computing part extracts distance information between the first edge information and the second edge information based on the length information, and corrects 3D model information of the secondary battery based on the distance information.

11. A 3D scanning apparatus for a cylindrical secondary battery, the 3D scanning apparatus comprising:

a rest portion configured for a secondary battery seated thereon to rotate around a longitudinal axis;
   a rear lighting part configured to emit light toward the side of the secondary battery;
   a camera provided opposite the rear lighting part, with the secondary battery interposed therebetween;
   a front lighting part configured to emit light toward the side of the secondary battery;
   a controller configured to control the rest portion and the camera so as to acquire an image of the secondary battery for each rotation of the secondary battery by a predetermined angle; and
   a computing part configured to process an image acquired from the camera,
   wherein the computing part is configured to extract points on the outline of the secondary battery from images of the secondary battery for respective angles and reconstruct a three-dimensional model, and is configured to generate an inspection image by extracting surface portions of the secondary battery from images of the secondary battery for respective angles.

12. The 3D scanning apparatus of claim 11, wherein the front lighting part is configured to emit light from at least one different position along the lengthwise direction of the secondary battery.

13. The 3D scanning apparatus of claim 12, wherein the controller is configured to control the rest portion and the camera so as to acquire a projection image for each rotation of the secondary battery by a first angle, and is configured to control the front lighting part and the camera so as to acquire a side image for each rotation of the secondary battery by a second angle.

14. The 3D scanning apparatus of claim 13, wherein the first angle is smaller than the second angle.

15. The 3D scanning apparatus of claim 14, wherein the computing part is configured to generate a partial inspection image by cropping portions of the side of the secondary battery from a plurality of images acquired from each rotation of the secondary battery by the second angle and merging the cropped portions together.

16. The 3D scanning apparatus of claim 15, wherein the computing part is configured to generate a full-side inspection image by combining partial inspection images for respective second angles.

17. The 3D scanning apparatus of claim 16, further comprising a defect detecting part configured to detect appearance defects by analyzing an inspection image of the side of the secondary battery.

18. The 3D scanning apparatus of claim 13, wherein the computing part is configured to extract boundary points on the side from the image and create a three-dimensional model based on the angle of the secondary battery and the boundary points.

19. The 3D scanning apparatus of claim 18, wherein the computing part is configured to extract the coordinates of pixels defining a boundary in order to extract boundary points on the side of the secondary battery.

20. The 3D scanning apparatus of claim 13, wherein the controller sets the first angle to be smaller than the second angle.

* * * * *